United States Patent [19]
Nagaishi et al.

[11] Patent Number: 5,946,907
[45] Date of Patent: Sep. 7, 1999

[54] ENGINE CATALYST ACTIVATION DETERMINING DEVICE AND ENGINE CONTROLLER RELATED THERETO

[75] Inventors: Hatsuo Nagaishi; Takehiko Itami; Hideaki Takahashi, all of Yokohama, Japan

[73] Assignee: Nissan Motor Co., Ltd., Kanagawa, Japan

[21] Appl. No.: 08/787,486

[22] Filed: Jan. 22, 1997

[30] Foreign Application Priority Data

Jan. 29, 1996 [JP] Japan .................................. 8-013189

[51] Int. Cl.$^6$ ........................................ F01N 3/00
[52] U.S. Cl. .................. 60/284; 60/285; 60/289
[58] Field of Search .............. 60/284, 285, 289, 60/274

[56] References Cited

U.S. PATENT DOCUMENTS

| | | | |
|---|---|---|---|
| 5,462,039 | 10/1995 | Mamiya et al. | 60/284 |
| 5,535,586 | 7/1996 | Ohta et al. | 60/285 |
| 5,577,383 | 11/1996 | Kuroda et al. | 60/284 |
| 5,675,968 | 10/1997 | Katashiba et al. | 60/289 |

FOREIGN PATENT DOCUMENTS

| | | |
|---|---|---|
| 64-22816 | 2/1989 | Japan . |
| 1-280651 | 11/1989 | Japan . |
| 7-71304 | 3/1995 | Japan . |

*Primary Examiner*—Thomas E. Denion
*Attorney, Agent, or Firm*—McDermott, Will & Emery

[57] ABSTRACT

The determining precision of catalyst activation, which is the basis for stopping a secondary air supply to accelerate catalyst activation and start air-fuel ratio feedback control, is enhanced. An engine cooling water temperature is detected, and a catalyst activation water temperature is determined from an engine startup water temperature based on predetermined characteristics. The catalyst activation water temperature is set to be lower the lower the startup cooling water temperature, and is set such that a difference between a predetermined temperature and an engine startup cooling water temperature is larger the lower the startup cooling water temperature. In this way, catalyst activation is determined with high precision according to the startup water temperature and subsequent cooling water temperature variation.

14 Claims, 4 Drawing Sheets

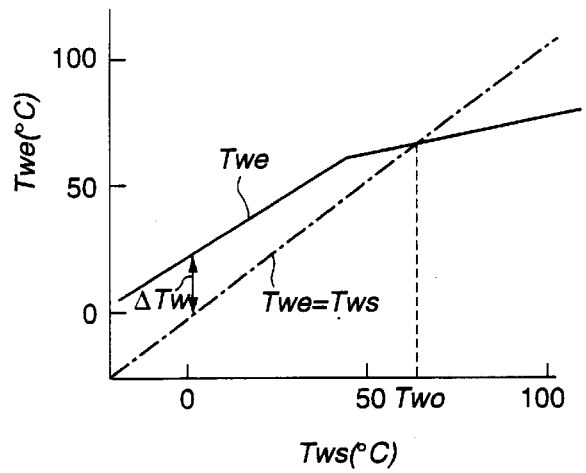
FIG.3
FIG.4A STARTER SWITCH
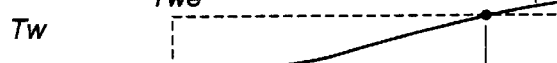
FIG.4B Tw
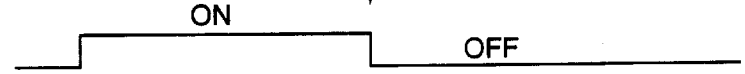
FIG.4C SECONDARY AIR SUPPLY
FIG.4D FUEL INCREASE
FIG.4E α
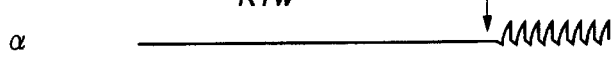
FIG.4F AIR-FUEL RATIO LEAN RICH
FIG.4G TOXIC SUBSTANCES
START OF CATALYST ACTIVATION

ENGINE CATALYST ACTIVATION DETERMINING DEVICE AND ENGINE CONTROLLER RELATED THERETO

FIELD OF THE INVENTION

This invention relates to a device for determining catalyst activation required to perform various engine controls.

BACKGROUND OF THE INVENTION

In an engine provided with a catalytic converter, it is known that supplying secondary air into the housing of the converter during the warm-up period of the engine may accelerate the activation of the catalyst in the converter.

For example, in Jikkai Sho 64-22816 published by the Japanese Patent Office in 1989, it is disclosed how a secondary air supply inlet is provided in an exhaust passage connecting the catalytic converter with an engine exhaust manifold, and part of the air aspirated into the engine intake passage is directly supplied to this inlet without the intervention of the engine. As the catalyst is not active immediately after startup, this supply of secondary air to the exhaust passage increases the oxygen concentration in the interior of the catalytic converter, thereby accelerating temperature rise of the catalyst and promoting its activation.

When the catalyst is activated, the supply of secondary air is stopped. The determination of whether or not the catalyst has become active is made by determining, for example, whether or not the engine cooling water temperature has reached a predetermined temperature.

When the air-fuel ratio of the gas mixture supplied to the engine is feedback-controlled, catalyst activation is an important factor. In this case, the time required for activation depends also on the cooling water temperature at engine startup. Tokkai Hei 1-280651 published in 1989 and Tokkai Hei 7-71304 published in 1995 by the Japanese Patent Office, for example, therefore propose that a feedback control start timing should be determined according to the cooling water temperature at engine startup. Engine cooling water temperature has thus conventionally been widely employed as a parameter for determining catalyst activation.

However, as catalyst activation and cooling water temperature do not have a unique correspondence, a precise determination of activation cannot be made simply by determining whether the cooling water temperature has reached a predetermined temperature. The determination of catalyst activation is also not precise if it is determined by the elapsed time after engine startup for which different reference values are set depending on cooling water temperature at startup, because the determination takes no account whatever of engine running conditions after startup.

In any of these cases, there may therefore be a considerable time error between the activation as determined and real activation, and this error leads to various disadvantages.

Specifically, when the supply of secondary air is stopped before catalyst activation is completed, the completion of catalyst activation takes a longer time.

Conversely when the supply of secondary air is continued after the catalyst is activated, reduction of nitrogen oxides (NOx) in the exhaust is prevented by the excess oxygen.

Moreover, the catalyst will be overheated which will lead to its early deterioration.

When air-fuel ratio control assuming that the catalyst has become active, is performed before full activation, toxic components in the exhaust increase. The same is true when air-fuel ratio control assuming that the catalyst is not activated, is continued after full activation.

Hence, insofar as far as concerns secondary air or air-fuel ratio control, errors in determining catalyst activation are undesirable whether they are positive or negative.

SUMMARY OF THE INVENTION

It is therefore an object of this invention to precisely determine catalyst activation based on engine cooling water temperature.

It is a further object of this invention to improve the precision of secondary air supply control or air-fuel ratio control by precisely determining catalyst activation.

In order to achieve the above objects, this invention provides a device for determining catalyst activation for use with a water-cooled engine which is provided with a catalyst for purifying exhaust in an exhaust passage of the engine. The device comprises a mechanism for detecting engine startup, a mechanism for detecting an engine cooling water temperature, a mechanism for determining that the catalyst is active when the cooling water temperature after engine startup reaches a predetermined temperature, and a mechanism for setting the predetermined temperature to be lower the lower the startup cooling water temperature, and setting the predetermined temperature such that a difference between the predetermined temperature and engine startup cooling water temperature is larger the lower the startup cooling water temperature.

This invention also provides a device for controlling secondary air supply to an exhaust passage of a water-cooled engine in order to activate a catalyst which is provided in the exhaust passage for purifying exhaust of the engine. The device comprises a mechanism for detecting engine startup, a mechanism for detecting an engine cooling water temperature, a mechanism for determining that the catalyst is active when the cooling water temperature after engine startup reaches a predetermined temperature, a mechanism for setting the predetermined temperature to be lower the lower the startup cooling water temperature, and setting the predetermined temperature such that a difference between the predetermined temperature and an engine startup cooling water temperature is larger the lower the startup cooling water temperature, and a mechanism for stopping the secondary air supply when it is determined that the catalyst is active.

It is preferable that the device further comprises a secondary air passage for supplying secondary air to the exhaust passage by connecting an engine intake passage with the exhaust passage, and a cut-off valve which opens and closes the secondary air passage, and the stopping mechanism comprises a mechanism for stopping the supply of the secondary air by shutting the cut-off valve.

It is further preferable that the device further comprises an air pump which delivers secondary air to the exhaust passage via the secondary air passage and which operates in conjunction with the opening and closing of the cut-off valve.

Alternatively, the device further comprises a reed valve in the secondary air passage which allows flow of air from the intake passage towards the exhaust passage, but prevents flow of air in the reverse direction.

This invention also provides a device for controlling an air-fuel ratio of a fuel mixture supplied to such a water-cooled engine that is provided with a catalyst in an exhaust passage for purifying exhaust. The device comprises a mechanism for detecting engine startup, a mechanism for detecting an engine cooling water temperature, a mechanism for determining that the catalyst is active when the cooling water temperature after engine startup reaches a predetermined temperature, a mechanism for setting the predetermined temperature to be lower the lower the startup cooling water temperature, and setting the predetermined temperature such that a difference between the predetermined temperature and engine startup cooling water temperature is larger the lower the startup cooling water temperature, first mechanism for controlling the air-fuel ratio of the fuel mixture to a suitable value before catalyst activation, second mechanism for controlling the air-fuel ratio of the fuel mixture to a suitable value after catalyst activation, and a mechanism for arranging that the air-fuel ratio is controlled by the first mechanism before it is determined that the catalyst is active, and arranging that the air-fuel ratio is controlled by the second mechanism after it is determined that the catalyst is active.

It is preferable that the second control mechanism comprises a mechanism for detecting the air-fuel ratio of the fuel mixture, and a mechanism for correcting a fuel amount of the fuel mixture such that the air-fuel ratio is a stoichiometric air-fuel ratio.

The details as well as other features and advantages of this invention are set forth in the remainder of the specification and are shown in the accompanying drawings.

BRIEF DESCRIPTION OF THE DRAWINGS

FIG. 3 is a graph showing the characteristics of a reference value Twe, related to engine cooling water temperature, which is a basis for determining catalyst activation according to the controller.

FIGS. 4A–4G are timing charts showing an example of secondary air supply control and air-fuel ratio control according to this invention.

DETAILED DESCRIPTION OF THE PREFERRED EMBODIMENTS

Figure 1:
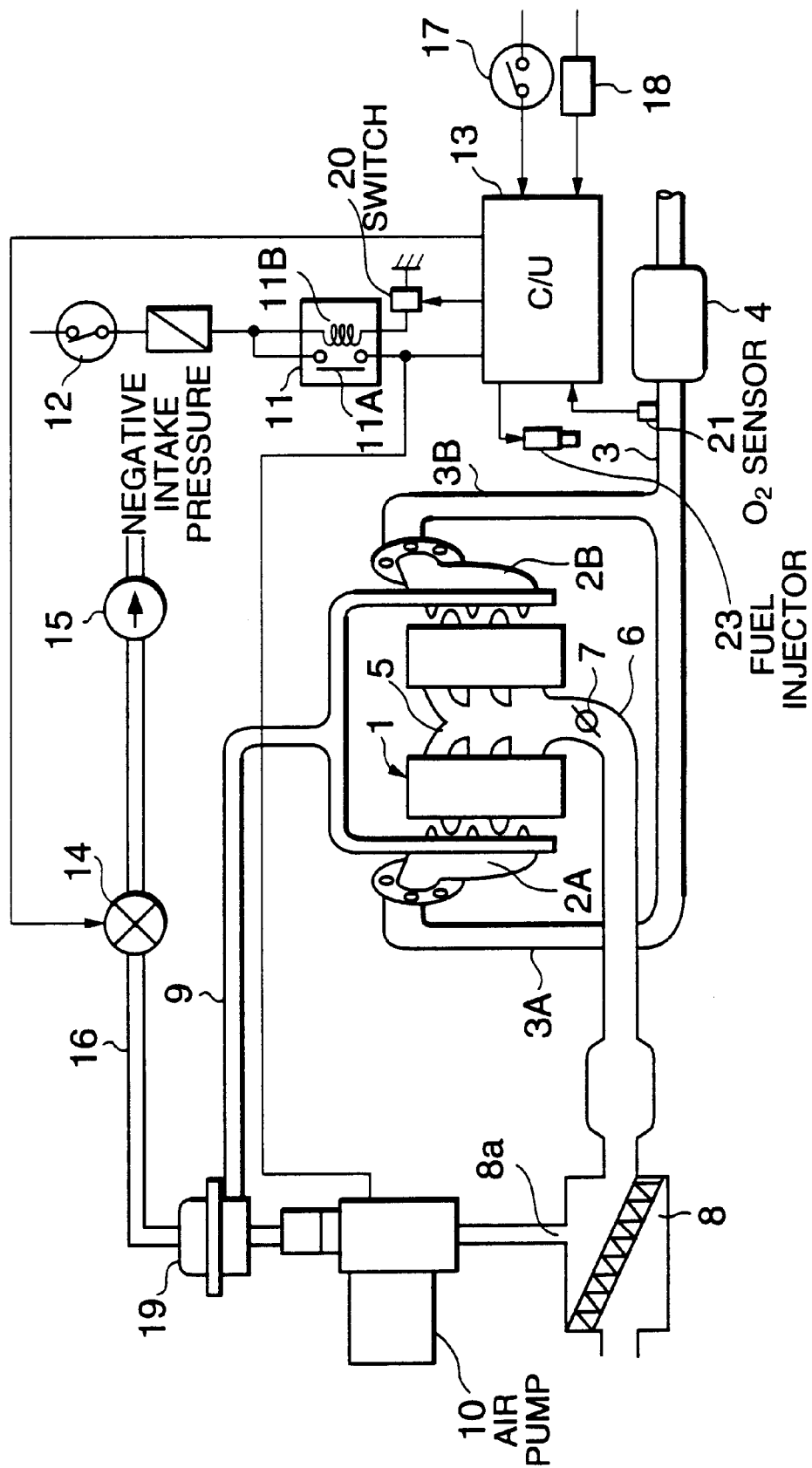
FIG. 1 is a schematic diagram of a secondary air supply and air-fuel ratio controller according to this invention.

Referring to FIG. 1 of the drawings, a V-type six cylinder water-cooled engine 1 mounted on a vehicle chassis is provided with Two exhaust manifolds 2A, 2B connected to the exhaust ports of each cylinder.

Exhaust pipes 3A, 3B are connected to the exhaust manifolds 2A, 2B, and these pipes 3A, 3B are then combined into one exhaust pipe 3. A catalytic converter 4 is disposed midway in the pipe 3 after the join of the pipes 3A, 3B. The catalytic converter 4 incorporates a three-way catalyst which purifies exhaust by oxidizing carbon monoxide (CO) and hydrocarbons (HC), and reducing nitrogen oxides (NOx).

Intake pipes 6 are connected to each intake port of the engine 1 via an intake manifold 5. Each intake pipe 6 aspirates air into the engine 1 via an air cleaner 8. A throttle 7 which varies the intake air amount is disposed in the pipe 6.

An inlet 8A for aspirating secondary air to activate the catalyst is formed in the air cleaner 8. The inlet 8A is connected to the exhaust manifolds 2A, 2B via a secondary air passage 9 in which an electrical air pump 10 and cut-off valve 19 are disposed in series.

Motor drive leads for driving the air pump 10 are connected to contacts 11A of a relay 11. The ground wiring of the motor is not shown in the diagram.

The contact 11A closes when a relay coil 11B of the relay 11 is energized, and supplies current to the air pump 10 via an ignition switch 12 of the engine 1 from a battery, not shown. The relay coil 11B is connected to the battery via the ignition switch 12. The relay coil 11B is energized by a switch 20 which opens and closes according to an energizing signal from a control unit 13. Specifically, when the switch 20 is switched from OFF to ON when the ignition switch 12 is ON, the relay coil 11B is energized.

The cut-off valve 19 has a negative pressure chamber formed by a diaphragm. When the diaphragm deforms due to negative pressure led into the negative pressure chamber via a negative pressure passage 16, the secondary air passage 9 opens and when atmospheric pressure is led into the negative pressure chamber, the secondary air passage 9 closes.

The negative pressure passage 16 is connected to the intake manifold 5.

An electromagnetic valve 14 and a check valve 15 are disposed in series in the negative pressure passage 16. The check valve allows air to flow only in a direction from the negative pressure chamber to the intake manifold 5. Expressed differently, this flow direction is the direction in which negative pressure in the manifold 5 is led to the negative pressure chamber.

The electromagnetic valve 14 is a three-way valve which selectively connects the negative pressure chamber to the intake manifold 5 and to the atmosphere according to a signal input from the control unit 13.

The control unit 13 comprises a personal computer. Signals from a starter switch 17 which detects the operation of a starter motor that starts the engine, a water temperature sensor 18 which detects the water temperature of the engine and an $O_2$ sensor 21 which detects an oxygen concentration in the exhaust passage 3, are input to the control unit 13.

Based on these signals, the control unit 13 determines whether or not the catalyst 4 in the catalytic converter has become active after startup of the engine 1. Depending on the determination result, secondary air is supplied to the exhaust passage 3 or the supply is cut off according to signals output to the electromagnetic valve 14 and switch 20. These signals are output such that the valve 14 and switch 20 are operated simultaneously, i.e., when the switch 20 is turned on, the valve 14 connects the negative pressure chamber to the intake manifold 5, and when the switch is turned off, the valve 14 leads atmospheric pressure to the negative pressure chamber.

The control unit 13 controls the air-fuel ratio of the fuel mixture supplied to the engine 1 according to signals output to a fuel injector 23 disposed in the intake manifold 5. This control is divided into a catalyst pre-activation air-fuel ratio control and a catalyst post-activation air-fuel ratio control. In pre-activation air-fuel ratio control, a fuel amount is increased by a post-startup fuel increase correction coefficient KAS and a water temperature increase correction coefficient Ktw. This pre-activation air-fuel ratio control is disclosed in, for example, U.S. Pat. No. 5,529,043, Further, according to this embodiment, the air-fuel ratio during the pre-activation control is maintained at a leaner value than the stoichiometric air-fuel ratio.

In post-activation air-fuel ratio control, referred to herein as air-fuel ratio feedback control or λ (lambda) control, the fuel injection amount of the injector 5 is controlled so that the air-fuel ratio detected by the $O_2$ sensor 21 is maintained in the vicinity of the stoichiometric air-fuel ratio. This air-fuel ratio feedback control is disclosed in, for example, U.S. Pat. No. 5,327,876.

In the controller according to this invention, pre-activation control is performed so that the air-fuel ratio is maintained at a leaner value than the stoichiometric air-fuel ratio, and control switches over to $\lambda$ control when catalyst activation is complete.

Figure 2:
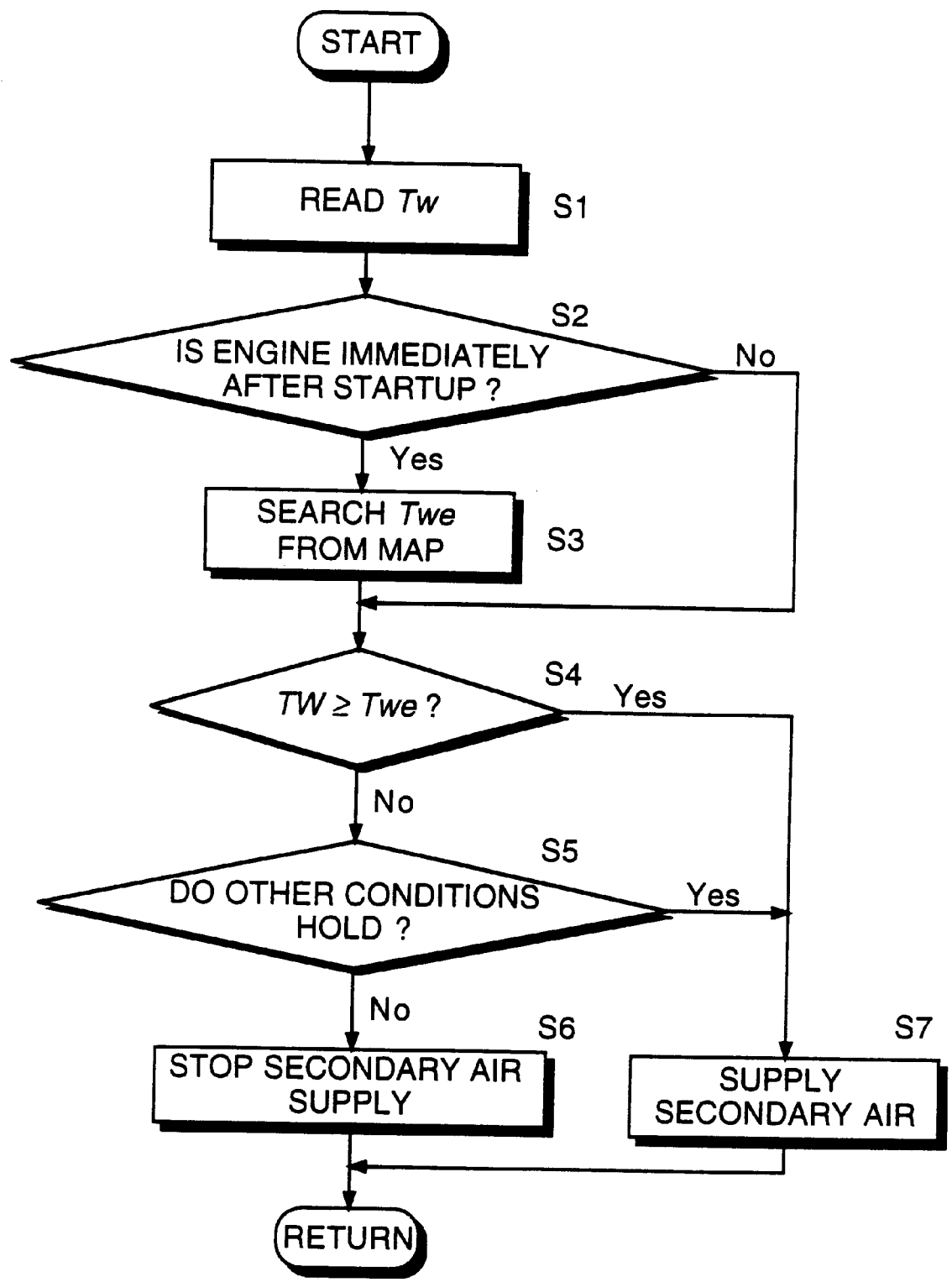
FIG. 2 is a flowchart describing a process of controlling secondary air supply and air-fuel ratio performed by the controller.

Next, the control performed by the control unit 13 will be described referring to the flowchart of FIG. 2. This routine may be performed at predetermined times or at predetermined engine rotation angles.

In a step S1, a cooling water temperature Tw of the engine 1 detected by the water temperature sensor 18 is read.

In a step S2, it is determined, from a signal input from the starter switch 17, whether or not the engine 1 is in a state immediately after startup. Specifically, the time when the output signal from the starter switch 17 changes from ON to OFF is considered to be immediately after startup.

Immediately after startup, in a step S3, a catalyst activation water temperature Twe is searched from a map shown in FIG. 3 based on a startup water temperature Tws. If it is not immediately after startup, the routine proceeds from the step S2 to step S4. The catalyst activation water temperature Twe indicates the cooling water temperature at which it is determined that the catalyst has become active. The catalyst activation water temperature Twe has the characteristics shown in FIG. 3, i.e. the startup water temperature Tws is lower the lower the temperature, and a difference $\Delta$Tw between the catalyst activation water temperature Twe and the startup water temperature Tws is larger the lower the startup water temperature Tws. The catalyst activation water temperature Twe is preset to have these characteristics, and stored as a map in the control unit 13.

In a step S4, the present cooling water temperature Tw and catalyst activation temperature Twe are compared, and when Tw<Twe, it is determined that the catalyst is not fully active so the routine proceeds to a step S5. When Tw>Twe, the routine proceeds to a step S7. In the step S5, it is determined whether other conditions hold for performing pre-activation secondary air supply and air-fuel ratio control. Specifically, these conditions are that the vehicle is not travelling at high speed, that the sensors have not detected any fault, and that a predetermined battery voltage is obtained. When any of these conditions is not satisfied in the step S5, the routine proceeds to the step S7. In the step S7, secondary air supply is stopped, and the air-fuel ratio control is switched from catalyst pre-activation to $\lambda$ control.

On the other hand, when all the other conditions hold in the step S5, secondary air is supplied and catalyst pre-activation air-fuel ratio control is performed.

Hence, secondary air is supplied and catalyst pre-activation control is performed until the cooling water temperature Tw of the engine 1 reaches the catalyst activation cooling water temperature Twe. When the catalyst activation cooling water temperature Twe is reached, supply of secondary air is stopped and air-fuel ratio control is switched over to $\lambda$ control.

FIGS. 4A–4G show the state of the starter switch before and after this switchover based on catalyst activation, variation of the cooling water temperature Tw, secondary air supply status, fuel increase amount status, variation of the air-fuel ratio feedback correction coefficient $\alpha$, variation of the air-fuel ratio, and variation of the amount of toxic substances discharged as exhaust.

Referring to these figures, when the starter switch is switched from ON to OFF, the catalyst activation water temperature Twe is searched from the cooling water temperature Tw at that time. Until the cooling water temperature Tw reaches the catalyst activation cooling water temperature Twe, secondary air supply continues and the fuel amount is increased by KAS or Ktw. However, air-fuel ratio feedback correction is not performed, and the air-fuel ratio feedback correction coefficient a is fixed at 1. The air-fuel ratio feedback correction coefficient $\alpha$ is known from the aforesaid U.S. Pat. No. 5,327,876. According to this embodiment, the air-fuel ratio is controlled to be always lean during the pre-activation control.

When the cooling water temperature Tw reaches the catalyst activation water temperature Twe, secondary air supply is stopped and fuel amount increase is stopped. Air-fuel ratio lean control is also switched over to $\lambda$ control, and the air-fuel ratio correction coefficient thereafter fluctuates within a predetermined range about 1 as center.

At the same time, oxidation of the toxic substances CO and HC proceeds more actively due to the activation of the three-way catalyst, and discharge of these substances into the atmosphere decreases. However reduction of NOx, which is also a toxic substance, is not enhanced merely due to activation of the three-way catalyst, but is enhanced when the catalyst is active and the secondary air supply stops. Hence the timing with which the catalyst is determined to be activate is of utmost importance in decreasing emission of toxic substances. When this timing is too early, supply of secondary air is stopped too early and catalyst activation is delayed; conversely, when the timing is too late, enhancement of NOx reduction by the catalyst is delayed as a result of excessive oxygen enrichment due to the secondary air.

When the determination of catalyst activation is based solely on whether or not the cooling water temperature Tw has reached a fixed, predetermined temperature, as in Jikkai Sho 64-22816 of the aforesaid prior art example, the effect of startup water temperature on catalyst activation is not taken into account. Also when the time required for catalyst activation is fixed by the startup water temperature Tws, as in Tokkai Hei 1-280651 or Tokkai Hei 7-71304 of the aforesaid prior art, the effect of engine running conditions after startup is not considered. When however the catalyst activation water temperature Twe is determined based on the startup cooling water temperature Tws as in this invention, factors which were not taken into account in the prior art are included, and a more precise determination of catalyst activation can be made using the same water temperature sensors as in conventional equipment.

When the startup water temperature Tws is higher than a predetermined value Two in FIG. 3, the startup water temperature Tws is higher than the catalyst activation water temperature Twe. In this case, it is determined that the catalyst is active immediately after startup, supply of secondary air and catalyst pre-activation air-fuel ratio control are not performed, and air-fuel ratio control by $\lambda$ control is performed immediately after engine startup.

Figure 5:
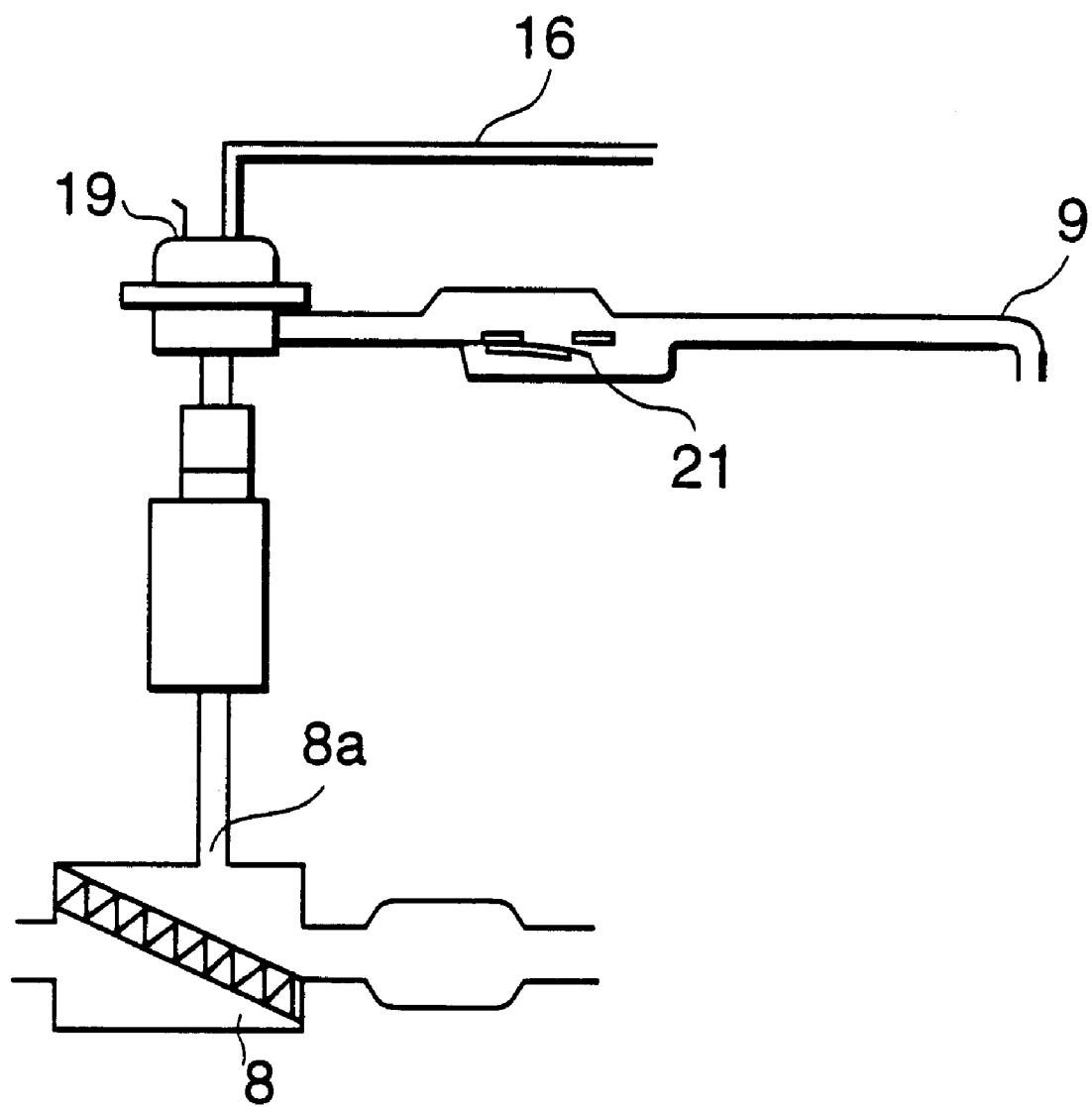
FIG. 5 is a schematic diagram of the essential parts of a secondary air supply controller according to another embodiment of this invention.

FIG. 5 shows another embodiment of this invention related to a secondary air supply mechanism.

This embodiment is related to a secondary air supply mechanism applied to a four cylinder engine, in which secondary air is supplied to the exhaust passage using the exhaust pulsation of the four cylinder engine instead of the air pump 10. In other words, the pressure in the exhaust passage periodically goes negative due to the pulsation, and secondary air is led from the air cleaner 8 to the exhaust passage by this negative pressure.

A reed valve 21 comprising a stopper, valve body and valve seat is provided in the secondary air passage 9 downstream of the cut-off valve 19. This reed valve has the function of a check valve which prevents exhaust in the exhaust passage from flowing back into the intake passage.

The secondary air supply mechanism using the exhaust pulsation is generally applied to four cylinder engines as explained hereinabove. However, it is also applicable to V-type six or eight cylinder engines, if the engines have an independent exhaust system for each cylinder bank.

The aforesaid embodiments have been described in the case of a controller which stops secondary air supply and switches over air-fuel ratio control based on the determination of catalyst activation. However, the catalyst activation determining device according to this invention may be applied also to ignition timing control, in which case it offers the same desirable advantages.

The embodiments of this invention in which an exclusive property or privilege is claimed are defined as follows:

What is claimed is:

1. A device for determining catalyst activation for use with a water-cooled engine which is provided with a catalyst for purifying exhaust in an exhaust passage of said engine, comprising:

means for detecting engine startup, means for detecting an engine cooling water temperature, means for determining that the catalyst is active when said cooling water temperature after engine startup reaches a predetermined temperature, and means for setting said predetermined temperature to be lower the lower the startup cooling water temperature, and setting said predetermined temperature such that a difference between said predetermined temperature and engine startup cooling water temperature is larger the lower the startup cooling water temperature.

2. A device for controlling secondary air supply to an exhaust passage of a water-cooled engine in order to activate a catalyst which is provided in said exhaust passage for purifying exhaust of said engine, comprising:

means for detecting engine startup, means for detecting an engine cooling water temperature, means for determining that the catalyst is active when said cooling water temperature after engine startup reaches a predetermined temperature, means for setting said predetermined temperature to be lower the lower the startup cooling water temperature, and setting said predetermined temperature such that a difference between said predetermined temperature and an engine startup cooling water temperature is larger the lower the startup cooling water temperature, and means for stopping a secondary air supply when it is determined that the catalyst is active.

3. A secondary air supply control device as defined in claim 2, further comprising a secondary air passage for supplying said secondary air to said exhaust passage by connecting an engine intake passage with said exhaust passage, and a cut-off valve which opens and closes said secondary air passage, wherein said stopping means comprises means for stopping the supply of said secondary air by shutting said cut-off valve.

4. A secondary air supply control device as defined in claim 3, further comprising an air pump which delivers said secondary air to said exhaust passage via said secondary air passage, said air pump operating in conjunction with the opening and closing of said cut-off valve.

5. A secondary air supply control device as defined in claim 3, further comprising a reed valve in said secondary air passage which allows flow of air from said intake passage towards said exhaust passage, but prevents flow of air in the reverse direction.

6. A device for controlling an air-fuel ratio of a fuel mixture supplied to a water-cooled engine, said engine being provided with a catalyst in an exhaust passage for purifying exhaust, comprising:

means for detecting engine startup, means for detecting an engine cooling water temperature, means for determining that the catalyst is active when said cooling water temperature after engine startup reaches a predetermined temperature, means for setting said predetermined temperature to be lower the lower the startup cooling water temperature, and setting said predetermined temperature such that a difference between said predetermined temperature and engine startup cooling water temperature is larger the lower the startup cooling water temperature, first means for controlling the air-fuel ratio of said fuel mixture to a suitable value before catalyst activation, second means for controlling the air-fuel ratio of said fuel mixture to a second suitable value after catalyst activation, and means for arranging that said air-fuel ratio is controlled by said first means before it is determined that the catalyst is active, and arranging that said air-fuel ratio is controlled by said second means after it is determined that the catalyst is active.

7. An air-fuel ratio controller as defined in claim 6, wherein said second control means comprises means for detecting the air-fuel ratio of said fuel mixture, and means for correcting a fuel amount of said fuel mixture such that the air-fuel ratio is a stoichiometric air-fuel ratio.

8. A device for determining catalyst activation for use with a water-cooled engine which is provided with a catalyst for purifying exhaust in an exhaust passage of the engine, comprising:

a switch adapted to produce a startup signal when a starter motor used to start the engine is activated;

a temperature sensor adapted to detect a water temperature of the engine and to produce a corresponding temperature signal; and a control unit adapted to receive the startup signal and the temperature signal, the control unit adapted to determine if the catalyst is active after the temperature signal produces a signal corresponding to a predetermined temperature, the predetermined temperature being set to be dependent upon a startup temperature of the engine such that a difference between the predetermined temperature and the startup temperature is larger the lower the startup temperature.

9. A device for controlling secondary air supply to an exhaust passage of a water-cooled engine in order to activate a catalyst which is provided in the exhaust passage for purifying exhaust of the engine, comprising:

a switch adapted to produce a startup signal when a starter motor used to start the engine is activated;

a temperature sensor adapted to detect a water temperature of the engine and to produce a corresponding temperature signal;

a control unit adapted to receive the startup signal and the temperature signal, the control unit adapted to determine if the catalyst is active after the temperature signal produces a signal corresponding to a predetermined temperature, the predetermined temperature being set to be dependent upon a startup temperature of the engine such that a difference between the predetermined temperature and the startup temperature is larger the lower the startup temperature, the control unit being adapted to produce a stop signal when the control unit determines that the catalyst is active; and a valve adapted to control a secondary air supply to the exhaust passage, the valve being adapted to prevent said secondary air supply to the exhaust passage upon receipt of the stop signal.

10. A secondary air supply control device as defined in claim 9, further comprising a secondary air passage for supplying said secondary air to the exhaust passage, the secondary air passage being connected to an engine intake passage and the exhaust passage, wherein the valve is positioned in the secondary air passage to open and close the secondary air passage.

11. A secondary air supply control device as defined in claim 10, further comprising an air pump that delivers said secondary air to the exhaust passage via the secondary air passage, said air pump operating in conjunction with the opening and closing of the valve.

12. A secondary air supply control device as defined in claim 10, further comprising a reed valve in the secondary air passage that allows flow of air from the intake passage towards the exhaust passage, but prevents flow of air in a reverse direction.

13. A device for controlling an air-fuel ratio of a fuel mixture supplied to a water-cooled engine, the engine being provided with a catalyst in an exhaust passage for purifying exhaust, comprising:

a switch adapted to produce a startup signal when a starter motor used to start the engine is activated;

a temperature sensor adapted to detect a water temperature of the engine and to produce a corresponding temperature signal;

a control unit adapted to receive the startup signal and the temperature signal, the control unit adapted to determine if the catalyst is active after the temperature signal produces a signal corresponding to a predetermined temperature, the predetermined temperature being set to be dependent upon a startup temperature of the engine such that a difference between the predetermined temperature and the startup temperature is larger the lower the startup temperature, the control unit being adapted to produce an output signal; and a fuel injector disposed in an intake manifold of the engine and adapted to receive the output signal from the control unit, the fuel injector and the control unit being adapted to control the air-fuel ratio of the fuel mixture at a first suitable value before the catalyst is active and at a second suitable value after the catalyst is active using the output signal.

14. An air-fuel controller as defined in claim 6, further comprising an oxygen sensor adapted to detect an oxygen concentration in the exhaust passage and to produce a corresponding oxygen concentration signal, wherein the control unit is adapted to receive the oxygen concentration signal and correspondingly adjust the second suitable value such that the air-fuel ratio is a stoichiometric air-fuel ratio.

* * * * *